United States Patent
Spock et al.

(10) Patent No.: US 9,800,472 B2
(45) Date of Patent: Oct. 24, 2017

(54) NETWORK NODE CONNECTION CONFIGURATION

(71) Applicant: PLEXXI INC., Nashua, NH (US)

(72) Inventors: Derek E. Spock, Boston, MA (US); Ruoding Li, Carlisle, MA (US)

(73) Assignee: PLEXXI Inc., Nashua, NH (US)

( * ) Notice: Subject to any disclaimer, the term of this patent is extended or adjusted under 35 U.S.C. 154(b) by 0 days.

(21) Appl. No.: 15/263,851

(22) Filed: Sep. 13, 2016

(65) Prior Publication Data
US 2016/0380838 A1    Dec. 29, 2016

Related U.S. Application Data

(63) Continuation of application No. 14/328,207, filed on Jul. 10, 2014.

(60) Provisional application No. 61/845,040, filed on Jul. 11, 2013.

(51) Int. Cl.
*H04B 10/00* (2013.01)
*H04L 12/24* (2006.01)
*H04Q 11/00* (2006.01)

(52) U.S. Cl.
CPC .......... *H04L 41/12* (2013.01); *H04L 41/0806* (2013.01); *H04L 41/0893* (2013.01); *H04Q 11/0005* (2013.01); *H04Q 2011/0018* (2013.01); *H04Q 2011/0035* (2013.01)

(58) Field of Classification Search
USPC .................................................. 398/45–57
See application file for complete search history.

(56) References Cited

U.S. PATENT DOCUMENTS

| | | | |
|---|---|---|---|
| 5,008,881 | A | 4/1991 | Karol |
| 5,576,875 | A | 11/1996 | Chawki et al. |
| 5,691,885 | A | 11/1997 | Ward et al. |
| 6,192,173 | B1 | 2/2001 | Solheim et al. |
| 6,233,074 | B1 | 5/2001 | Lahat et al. |

(Continued)

FOREIGN PATENT DOCUMENTS

| | | |
|---|---|---|
| EP | 0 486 203 | 11/1991 |
| EP | 0 620 694 | 4/1994 |

(Continued)

OTHER PUBLICATIONS

"A Policy-aware Switching Layer for Data Centers"; Electrical Engineering and Computer Sciences, University of California at Berkeley; Dilip Antony Joseph, Arsalan Tavakoli and Ion Stoica; Jun. 24, 2008.

(Continued)

*Primary Examiner* — Agustin Bello
(74) *Attorney, Agent, or Firm* — Preti Flaherty Beliveau & Pachios LLP

(57) ABSTRACT

A system and method for connectivity configuration of a network node permits an optical signal to be passed through the node and shifted from a first connector position to a second connector position that is offset from the first connector position. The shifted optical signal permits a number of distant nodes in the network to be reached with a direct optical connection, which can be configured to be bidirectional. The disclosed connectivity configuration reduces the cabling requirements for the network and simplifies the interconnections.

22 Claims, 7 Drawing Sheets

(56) References Cited

U.S. PATENT DOCUMENTS

| | | |
|---|---|---|
| 6,331,905 B1* | 12/2001 | Ellinas .............. H04J 14/0227 398/17 |
| 6,452,703 B1 | 9/2002 | Kim et al. |
| 6,493,118 B1 | 12/2002 | Kartalopoulos |
| 6,519,059 B1 | 2/2003 | Doerr et al. |
| 6,570,685 B1 | 5/2003 | Fujita et al. |
| 6,711,324 B1 | 3/2004 | Zang et al. |
| 6,760,302 B1 | 7/2004 | Ellinas et al. |
| 6,771,907 B1 | 8/2004 | Yoshifuji et al. |
| 6,785,472 B1 | 8/2004 | Adams et al. |
| 6,999,681 B2 | 2/2006 | Gruber et al. |
| 7,130,500 B2 | 10/2006 | Wachsman et al. |
| 7,224,895 B2* | 5/2007 | Garnot ................ H04J 14/0227 398/3 |
| 7,254,138 B2 | 8/2007 | Sandstrom |
| 7,254,336 B2 | 8/2007 | Harney et al. |
| 7,333,511 B2 | 2/2008 | Sandstrom |
| 7,433,593 B1 | 10/2008 | Gullicksen et al. |
| 7,477,844 B2 | 1/2009 | Gumaste et al. |
| 7,518,400 B1* | 4/2009 | Redgrave ................ G06F 5/015 326/37 |
| 7,522,837 B2 | 4/2009 | Tanobe et al. |
| 7,743,127 B2 | 6/2010 | Santos et al. |
| 7,986,713 B2 | 7/2011 | Sandstrom |
| 8,027,585 B2 | 9/2011 | Yokoyama |
| 8,543,957 B2* | 9/2013 | Takita ................ H04J 14/0227 370/230 |
| 8,886,040 B2* | 11/2014 | Vissers ................ H04J 3/1658 370/470 |
| 9,014,562 B2* | 4/2015 | Gerstel ............... H04J 14/0201 398/43 |
| 2002/0131118 A1 | 9/2002 | Chiaroni et al. |
| 2003/0046127 A1 | 3/2003 | Crowe et al. |
| 2003/0059154 A1 | 3/2003 | Sato |
| 2003/0175029 A1* | 9/2003 | Harney ............... H04J 14/0204 398/83 |
| 2004/0105364 A1 | 6/2004 | Chow et al. |
| 2004/0131064 A1 | 7/2004 | Burwell et al. |
| 2004/0131356 A1* | 7/2004 | Gerstel ............... H04J 14/0201 398/45 |
| 2004/0208548 A1* | 10/2004 | Gruber ................ H04J 14/0204 398/50 |
| 2005/0044195 A1* | 2/2005 | Westfall ................ H04L 49/101 709/223 |
| 2006/0123477 A1 | 6/2006 | Raghavan et al. |
| 2006/0228112 A1* | 10/2006 | Palacharla ............ H04J 14/02 398/45 |
| 2006/0275035 A1 | 12/2006 | Way |
| 2007/0154221 A1 | 7/2007 | McNicol et al. |
| 2008/0062891 A1 | 3/2008 | Van der Merwe et al. |
| 2008/0144511 A1 | 6/2008 | Marcondes et al. |
| 2008/0162732 A1 | 7/2008 | Ballew |
| 2008/0219666 A1* | 9/2008 | Gerstel ............... H04J 14/0201 398/79 |
| 2009/0092064 A1 | 4/2009 | Fan et al. |
| 2009/0138577 A1 | 5/2009 | Casado et al. |
| 2009/0219817 A1 | 9/2009 | Carley |
| 2009/0268605 A1 | 10/2009 | Campbell et al. |
| 2009/0296719 A1 | 12/2009 | Maier et al. |
| 2009/0328133 A1 | 12/2009 | Strassner et al. |
| 2010/0014518 A1 | 1/2010 | Duncan et al. |
| 2010/0115101 A1 | 5/2010 | Lain et al. |
| 2010/0121972 A1 | 5/2010 | Samuels et al. |
| 2010/0254374 A1 | 10/2010 | Fortier |
| 2010/0284691 A1 | 11/2010 | Zottmann |
| 2010/0302754 A1 | 12/2010 | Nordin |
| 2011/0026411 A1 | 2/2011 | Hao |
| 2011/0090892 A1 | 4/2011 | Cooke |
| 2012/0321309 A1 | 12/2012 | Barry et al. |
| 2013/0022047 A1 | 1/2013 | Nakashima et al. |
| 2013/0044588 A1* | 2/2013 | Kogge .................. H04L 12/42 370/223 |
| 2015/0078746 A1* | 3/2015 | Spock ................ H04L 41/0806 398/45 |
| 2015/0180606 A1* | 6/2015 | Gerstel ............... H04J 14/0201 398/79 |
| 2016/0380838 A1* | 12/2016 | Spock ................ H04L 41/0806 398/45 |

FOREIGN PATENT DOCUMENTS

| | | |
|---|---|---|
| EP | 2 429 122 | 3/2012 |
| WO | WO 2008/073636 | 6/2008 |
| WO | WO 2008/116309 | 10/2008 |
| WO | WO 2009/042919 | 4/2009 |
| WO | WO 2009/096793 | 8/2009 |
| WO | WO 2009/151847 | 12/2009 |
| WO | WO 2010/133114 | 11/2010 |
| WO | WO 2010/138937 | 12/2010 |

OTHER PUBLICATIONS

A Proposal of Hierarchical Chordal Ring Network Topology for WDM Networks; Tomoya Kitani, Nobuo Funabiki and Teruo Higashino; IEEE; 2004.

"A Torus-Based 4-Way Fault-Tolerant Backbone Network Architecture for Avionic WDM LANs"; The Department of Electrical and Computer Engineering, University of Florida; Dexiang Wang and Janise Y. McNair; Optical Society of America; Mar. 31, 2011.

"Flattened Butterfly: A Cost-Efficient Topology for High-Radix Networks"; John Kim, William J. Daily, Computer Systems Laboratory; Dennis Abts, Cray Inc.; Jun. 9-13, 2007.

"Hybrid Optical WDM Networks Utilizing Optical Waveband and Electrical Wavelength Cross-Connects"; Le et al.; Optical Society of America; 2011.

"Impact of Adaptive Layer 1 for Packet Switching Network Cost and QoS"; TRLabs Next Generation Internet Workshop; Mark Sandstrom; Optimum Communications; Nov. 9, 2007.

"Making High Bandwidth But Low Revenue Per Bit Network Applications Profitable"; Optimum Communications; Jan. 15, 2010.

"Optical Cross Connect Based on Wdm and Space-Division Multiplexing"; Y. D. Jin et al.; IEEE Photonics Technology Letters; Nov. 1995.

"Optimum Communications Services: Finally a way out of the zero-sum game?"; TechnologyInside on the web; Oct. 20, 2008.

"P2i-Torus: A Hybrid Architecture for Direct Interconnection"; Department of Computer Science and Technology, Tsinghua University; Chao Zhang and Menghan Li; IEEE; Dec. 24-26, 2011.

"Scalable Photonic Interconnection Network with Multiple-Layer Configuration for Warehouse-Scale Networks"; Sakano et al.; Optical Society of America; Aug. 2011.

"Seven Core Multicore Fiber Transmissions for Passive Optical Network"; Zhu et al.; Opitcs Express; vol. 18 Issue 11; 2010; pp. 11117-11122.

"WDM and SDM in Future Optical Networks"; H.J.H.N. Kenter et al.; Tele-Informatics and Open Systems Group, Department of Computer Science, University of Twente, The Netherlands; Jun. 22, 2000.

"WDM-Based Local Lightwave Networks Part II; Multihop Systems"; Biswanath Mukherjee; IEEE; Jul. 1992.

High Performance Datacenter Networks; Architectures, Algorithms, and Opportunities; Dennis Abts and John Kim; 2011.

Molex; Fiber Optic Product Families; FlexPlane Optical Circuit, Standard Routing 8-by- Perfect Shuffle, Kapton Substrate, 74.00mm Wide, 137.00mm, 1.50mm High; date unknown.

Sudevalayam, Sujesha et al., "Affinity-aware Modeling of CPU Usage for Provisioning Virtualized Applications," 2011 IEEE 4th International Conference on Cloud Computing, Jul. 4, 2011, pp. 139-146, XP031934583.

* cited by examiner

NETWORK NODE CONNECTION CONFIGURATION

BACKGROUND OF THE INVENTION

Communication networks tend to be constructed according to various physical and/or logical topologies, which can often depend on the capabilities of the components of the communication network. For example, FIG. 1 shows a communication network 100 in a hierarchical topology previously used in enterprise and data center communication networks.

Network 100 has a lower layer 110 comprised of servers 112, which are typically rack mounted or otherwise concentrated with regard to physical location. A layer 120 uses layer 2 top-of-the rack (TOR) switches 122 to connect servers 112. A layer 130 is composed of layer 2 and/or layer 3 aggregation switches (AS) 132 to interconnect several TOR switches 122. A layer 140 is the top layer of network 100, and is composed of core routers (CR) 142 that connect aggregation switches 132. Often, core routers 142 also function as a gateway to connect to an Internet 150.

One major drawback of the network architecture of network 100 is that the design is oriented mostly for network traffic from users to the servers, so-called North-South traffic that travels in a generally vertical direction in network 100. Due to the very high oversubscription ratio from layer 120 to layer 140, which is collectively from about 1:80 to about 1:240, the so-called West-East traffic between servers 112 that travels in a generally horizontal direction in network 100 can be subject to performance issues. For example, such high oversubscription ratios can create a bottle neck for traffic between servers 112, since the traffic typically flows through layers 120, 130 and 140, rather than directly between servers 112.

Several network topologies have been proposed to overcome the above-mentioned drawbacks of network 100, where the architecture aim is to flatten the network topology to promote West-East traffic and reduce the oversubscription ratio to a more reasonable range of from about 1:3 to about 1:1. FIG. 2 shows a communication network 200, which is an example of a so-called fat-tree topology for a data center. The topology of network 200 is a special type of Clos topology that is organized in a tree-like structure. Clos topologies help to reduce physical circuit switching needs with respect to the capacity of the switches used to implement the topology. This type of topology is built of k-port switches, and has k pods of switches. Each pod has two layers of switches, each layer has k/2 switches and each pod connects with $(k/2)^2$ servers. There are $(k/2)^2$ core switches, which connect with k pods. The total number of servers supported is $k^3/4$. Network 200 shows an example of the fat-tree topology with k=4. Accordingly, each switch 202 has four ports, there are four pods 210, 211, 212 and 213, with two layers and two switches in each layer. Each pod 210-213 connects with four servers 220, for a total of sixteen servers supported. There are four core switches 230 that connect with four pods 210-213. Note that although network 200 has twenty switches 202, compared to fourteen for network 100 (FIG. 1), each of switches 202 has four ports. Thus, the topology of network 200 can permit greater West-East traffic through-flow than network 100, and can reduce the oversubscription ratio with switches that have a relatively small number of ports. Also, network 200 avoids the use of expensive core routers 142 (FIG. 1). Network 200 also scales to larger server connections by adding more layers.

Besides fat-tree, other network topologies based on Clos architecture have been proposed, such as the spine and leaf topology of network 300 of FIG. 3. The topology of network 300 can be viewed as a folded Clos topology, and scales to larger server connections by adding more layers. Unlike the architecture of network 100 that has two big core routers 142, in the folded Clos design of network 300, each of layers 330 and 340 uses a relatively large number of switches that are connected to a lower layer.

However, fundamentally, both fat-tree and folded Clos architecture are topologically similar to traditional layered networks, in that they are all assembled in a tree like topology. The difference is the fat-tree and folded Clos arrangements use a series of switches in the top layer, while the traditional network uses one or more big routers at a top layer. These architectures are often called "scale-out" architecture rather than "scale-up" (bigger router) architecture.

One drawback of fat-tree and folded Clos architectures is the increased number of switches used. In addition, large numbers of cable connections are made between all the switches being used to implement the architectures. The complexity of the cabling connectivity and the sheer number of cables used to implement these architectures make them less attractive from a practicality viewpoint. Moreover, in practice, these architectures tend to scale poorly once the network has been built, due at least in part to the further increased complexity of modifying and adding a relatively large number of cable connections. In addition to the complexity, the costs tend to be driven up by relatively expensive cabling used to implement these architectures.

For example, optical cabling is often used to increase speed and throughput in a data center network. Switch ports are directly connected to other switch ports according to the topology configuration, so careful mapping of ports that may be physically separated by relatively large distances is undertaken. In addition, the physical reach of the optical cables is often expected to be greater than 100 meters. If there is a problem with cable or a switch component malfunction, correction of the problem can be costly as well as complicated to implement, since switches and/or cables may need to be installed, and correctly connected in accordance with the complex topology being implemented.

As data centers become more like high performance computing (HPC) platforms, many of the network topologies used in HPC have been proposed for data center networks. However, the topologies employed in an HPC application do not translate well to data center network environments, since the HPC computer processors tend to be densely packed, and the networking connections tend to be restricted to a smaller space, thus limiting complexity and cost for those applications.

Accordingly, the relationship between the number of switches, number of ports on a switch and cabling requirements to implement a desired network topology can present significant challenges in practice. Moreover, problems with scalability and maintenance further increase cost and complexity for scaling up or scaling out and maintaining a desired network topology.

BRIEF SUMMARY OF THE INVENTION

The present disclosure provides a system and method for connectivity of network devices that permits simplified connections for realizing complex networking topologies. The connectivity for the network devices can be achieved using lower cost components. The disclosed system and method permits cabling to be simplified and permits reduced cost cabling to be used to make connections while providing implementations of complex networking topologies. The disclosed system and method assist in simplifying connectivity implementation, so that complex networking topologies can be realized faster and with greater reliability.

Typically, data center network implementation involves connectivity that uses optical technology, which tends to dictate at least a portion of implementation cost. Some of the types of optical technology used for connectivity can include:

Fabry Perot Direct Modulation 1 km
DWDM 10G SFP+
CWDM 10G 10 km SFP+
850 nm 300 meter SR SFP+
Silicon Photonics 4 km 4×10G
850 nm 12×10G miniPod, 100 meter The above 850 nm 12 channel module tends to be the lowest cost solution but may be limited to a 100 meter reach. The Silicon Photonics 40G QSFP+ (quad small form factor pluggable) (from Molex) can reach 4 km and the cost can be one quarter of the CWDM (coarse wave division multiplexing) SFP+ solution. Although the Silicon Photonic 40G QSFP+ is not CWDM, it can advantageously be used in a low cost solution in accordance with the present disclosure. The present disclosure permits multi-fiber MTP (multi-fiber termination push-on) fiber to be incorporated into various topologies according to user design, and can accommodate topologies such as chordal rings, including mesh rings, such as a mesh ring with 11 or more nodes. A number of other desirable topologies are also possible.

According to an aspect of the present disclosure, a connectivity arrangement is provided at a network node that includes fiber optic transmitters and receivers. The connectivity configuration provides for pass-through fiber connections that are passive and that offer an optical signal path that is offset or shifted by one or more connector positions as the optical signal passes through the node. The connector position offset for pass-through fiber optic connections permits direct optical signal connection between network nodes that are not necessarily physically connected to each other.

For example, using a disclosed connectivity configuration, a fiber optic signal can originate on one node and be transmitted to another node via a direct physical connection. The transmitted fiber optic signal is received at a first connector interface at an incoming connector position and passed through the node via a passive fiber pathway to a second connector interface at an outgoing connector position that is shifted or offset from the incoming connector position. The second connector interface is directly physically connected to a third node that receives the optical signal directly from the first node via the intermediate node. Thus, the third node is not directly physically connected to the first node, but receives the optical signal directly from the first node via the shifted passive optical pathway in the intermediate node.

In the above example, there is a distinction between direct physical connections between nodes, and direct optical connections between nodes. The direct physical connection is in the form of a cable that can be directly connected between two nodes, while direct optical connection can be implemented via an optical connection between two nodes where the path of the direct optical connection includes an intermediate node that passively passes an optical signal that is shifted or offset by at least one to connector position. Accordingly, one or more nodes can be "skipped" with the use of the connection offset or shift, which connectivity configuration can be commonly applied to all of the nodes for simplified modularity and construction, while permitting simplified connectivity.

According to another aspect, one or more connector positions can each be coupled to a bidirectional fiber construct. The bidirectional construct can transmit and receive on a single fiber, so that a single connector position is used for transmitting and receiving. This configuration saves connector space and permits relatively complex network topologies to be implemented with fewer connector positions and thus reduce the number of connector positions that are used in the cabling provided to each of the nodes. The connectivity arrangement permits a bidirectional signal transmitted and received between the bidirectional constructs on different nodes to pass through one or more nodes with a passive connection based on a pathway that connects one connector position for one connector (plug) to an offset or shifted connector position for another connector (plug). The connectivity arrangement can be implemented at each node so that a common connectivity configuration can be used at each node to simplify connectivity cabling for the entire network.

The disclosed system and method can reduce the number of cables used to connect switches to implement relatively complex network topologies while providing greater chordal reach. The arrangement for connectivity in accordance with the present disclosure also can eliminate multiplexers/demultiplexers and wavelength division multiplexing lasers in a node to further reduce the component requirements and simplify connectivity solutions.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

This patent application claims priority from U.S. patent application Ser. No. 14/328,207, filed Jul. 10, 2014, which claims priority from U.S. Provisional Patent Application No. 61/845,040, filed Jul. 11, 2013, the disclosures of which are incorporated by reference herein in their entirety.

Data center switches and routers can utilize fiber optical interconnections through their network interface ports. In accordance with the present disclosure, standard fiber optical connectors in conjunction with internal fiber optical interconnections and configurations that can be used to implement desired network topologies.

Figure 1:
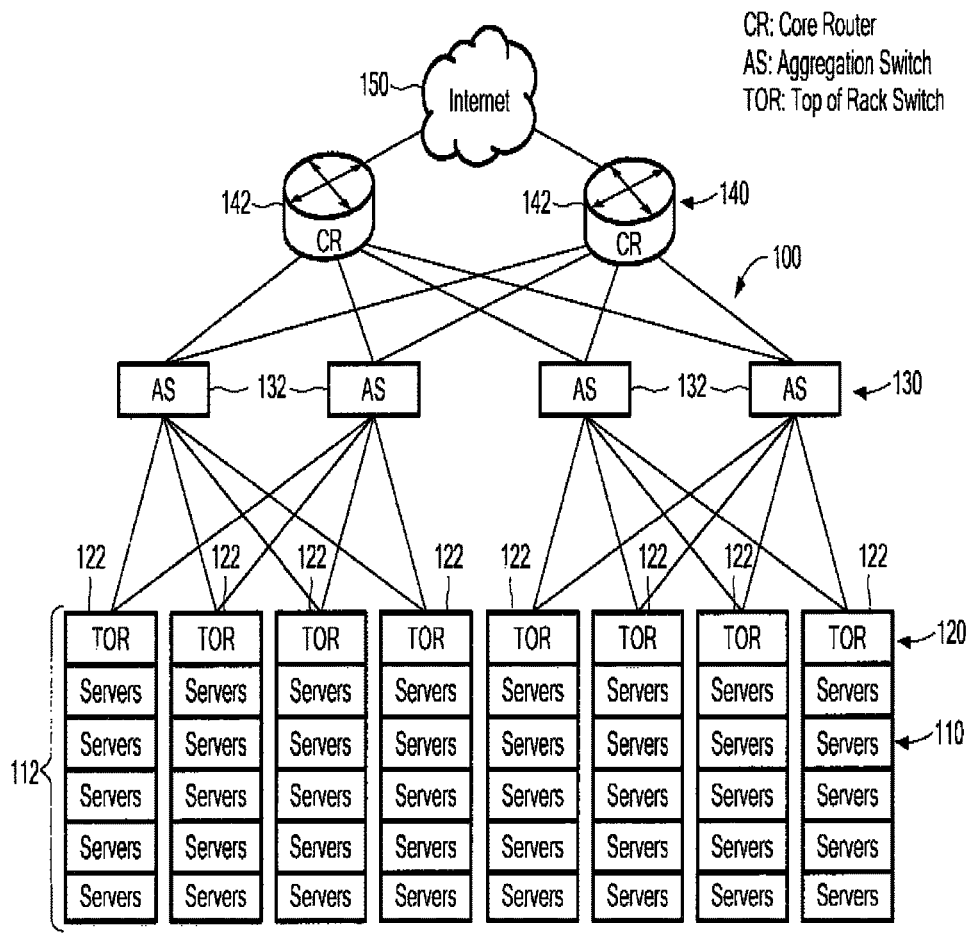
FIG. 1 is an illustration of a network organized according to a hierarchical three tier topology.
Figure 2:
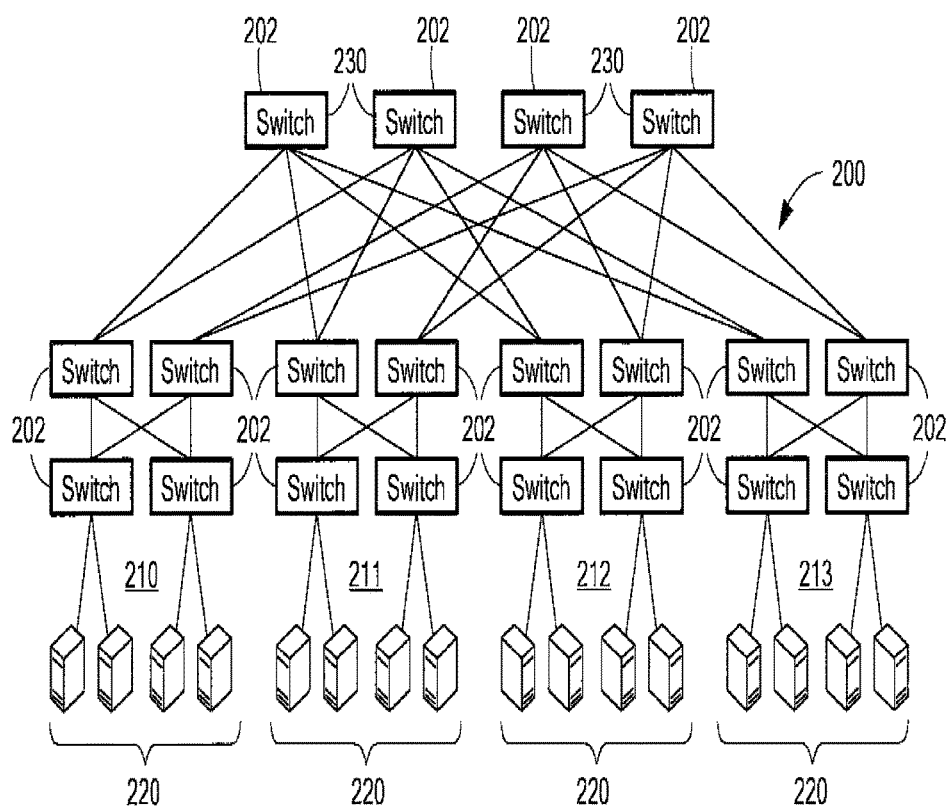
FIG. 2 is an illustration of a network organized according to a fat-tree topology.
Figure 3:
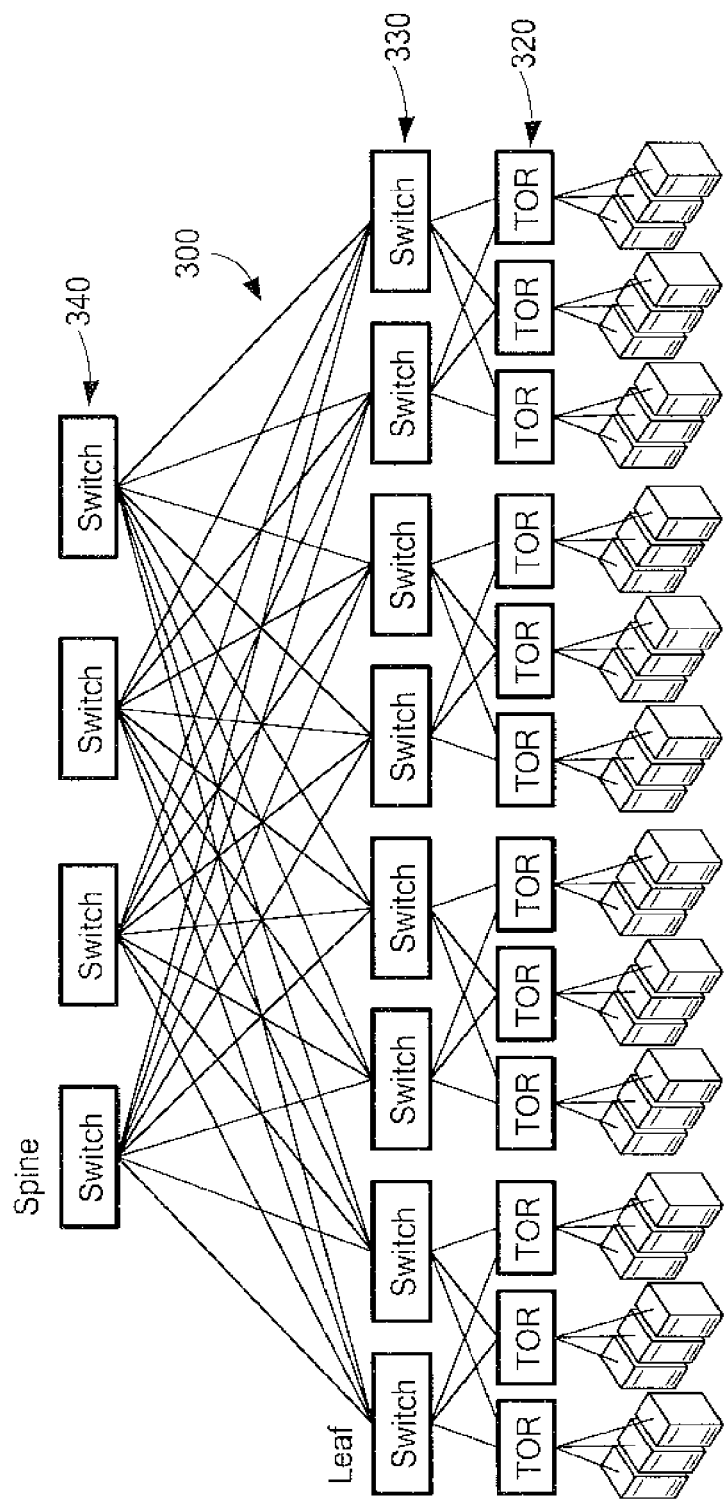
FIG. 3 is an illustration of a network organized according to a folded Clos topology.
Figure 4:
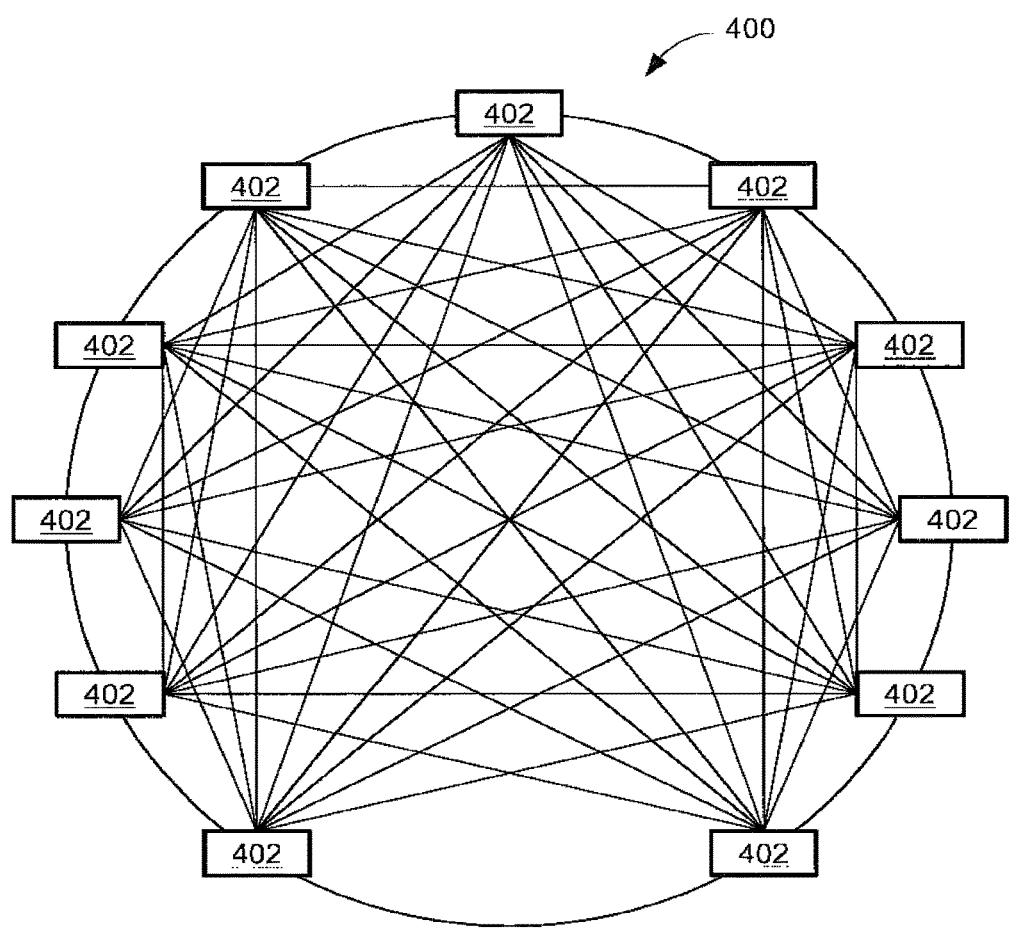
FIG. 4 is an illustration of a network organized according to a meshed ring topology.

FIG. 4 shows a network 400 that is implemented in a meshed ring architecture, where each switch 402 has a direct connection with all of the other switches 402. In prior implementations of network 400, each connection was accomplished with one or more physical cables. Such a physical topology implementation is limited in terms of scalability, since the size is limited by the total number of switch ports available for interconnection for each switch through a physical cable.

Figure 5:
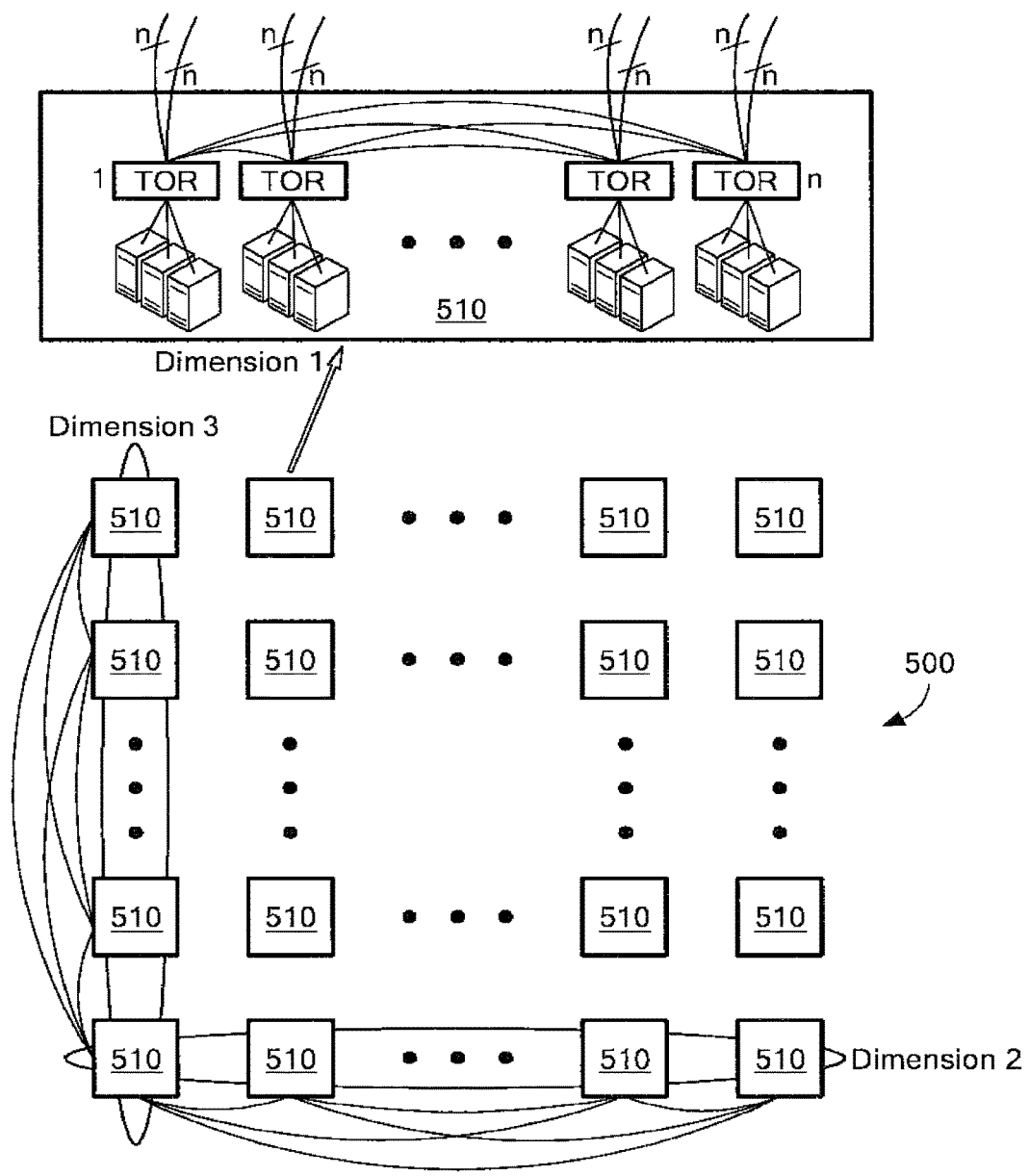
FIG. 5 is an illustration of a network organized according to a three dimension flattened butterfly topology.

FIG. 5 shows a network 500 organized as a three dimension flattened butterfly topology. This topology of network 500 can scale to large numbers of switch nodes 510 that can support a relatively large number of servers in a relatively large data center. Network 500 can be built using the same organization for switch nodes 510 for the entirety of network 500, and offers a flat network topology, higher bisection bandwidth, and low hop counts. However, previously implemented three dimension flattened butterfly architectures tend to have a high port count per switch, which tends to increase costs, and use long global connections, which tend to be relatively expensive and also add to implementation costs.

While the architectures illustrated in FIGS. 4 and 5 are attractive for a data center network from the perspective of performance, the complicated connectivity and cabling make networks 400 and 500 difficult to implement in terms of a physical topology in a data center environment in practice. In addition to the complexity, the costs tend to be driven up by relatively expensive cabling used to implement the topology, which implementation is typically made more challenging with the typical cabling errors that occur during installation.

Figure 6:
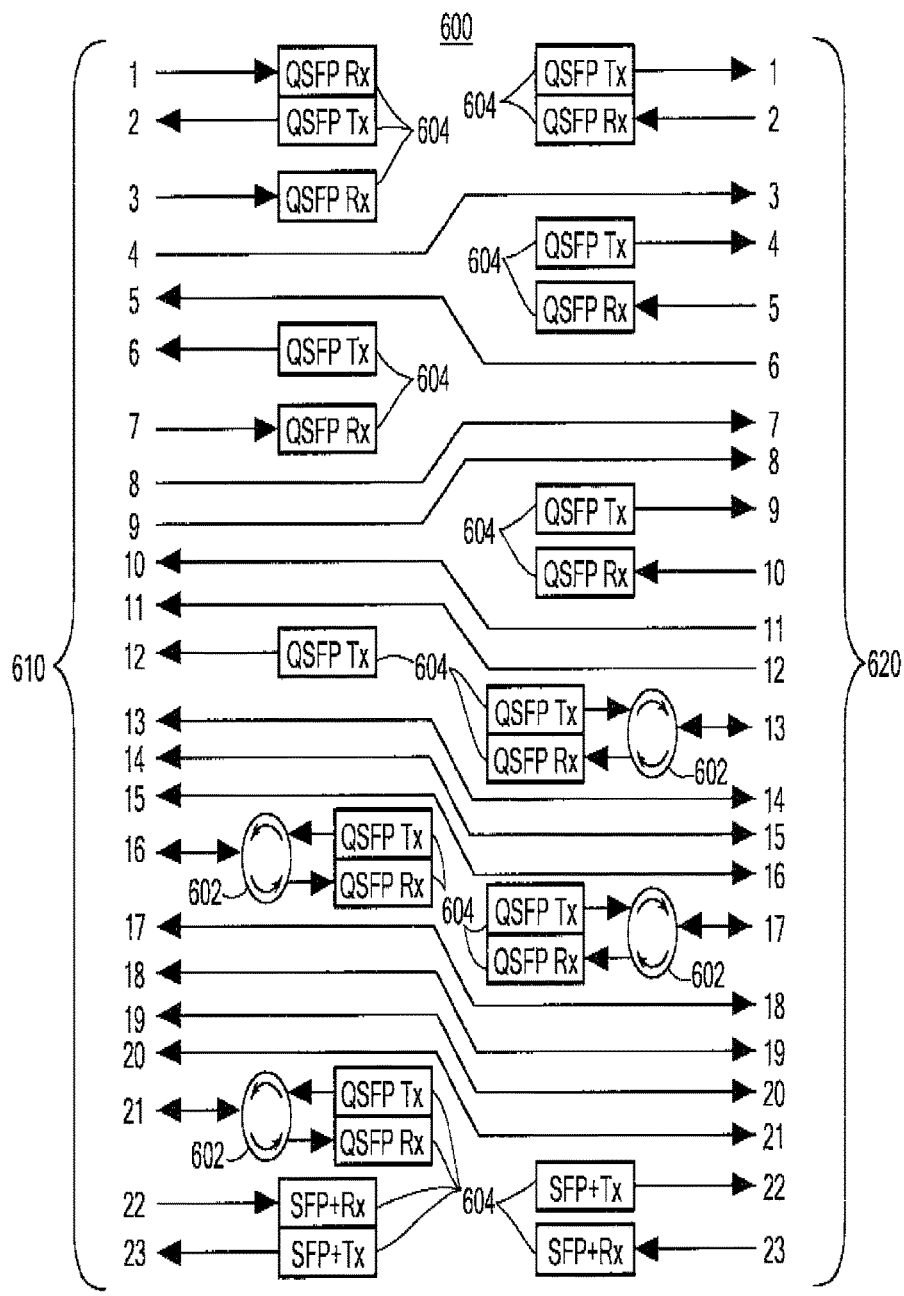
FIG. 6 is a diagram illustrating connectivity at a network node in accordance with an exemplary embodiment of the present disclosure.

FIG. 6 illustrates connectivity for a network node 600 in accordance with an exemplary embodiment of the present disclosure. Network node 600 includes two sets 610, 620 of connector positions that are each labeled 1-23. Each of connector positions 1-23 in sets 610, 620 are suitable for being coupled to optical fibers to transfer optical signals in and out of network node 600. Sets 610, 620 represent connections for external connectivity using standard fiber optical pluggable cables, such as MTP cables, which in the embodiment of network node 600 can have 24 fibers. It should be understood that although the disclosed system and method is described using the example of a 24 fiber connector and cable, any type of fiber cable can be employed with the connectivity configuration of the present disclosure. For example, cables with 48 fibers can be employed with the connectivity configuration of the present disclosure.

Some or all of the network nodes in a datacenter network can, for example, be configured with the arrangement of network node 600. In such a configuration, each of the connector positions 1-23 is connected to the same numbered connector position in a connected node. So, for example, connector position 1 in set 610 is connected to connector position 1 in a connector of a node to which network node is directly physically connected. In such an instance, connector position 1 of set 610 receives a signal from a connector position 1 of a network node physically connected to network node 600 via set 610. Likewise, connector position 1 of set 620 transmits a signal to a network node physically connected to network node 600 via set 620. Since all the network nodes in this exemplary embodiment can be configured with the same connectivity arrangement of network node 600, connector positions 1 and 2 of each set 610, 620 are respectively reserved for direct, one way, single fiber connections between physically connected nodes.

Connector positions 3-6 in sets 610 and 620 illustrate a shifted or offset arrangement for communicating between nodes. This arrangement permits an intermediate node to passively forward an optical signal from an originating node to a receiving node using a standard fiber optic cable. An optical signal launched from connector position 4 in set 620 would arrive on connector position 4 of set 610 at an intermediate network node, and the signal would be output at connector position 3 of set 620 of the intermediate node. The optical signal would then arrive at connector position 3 of set 610 of a receiving node, so that the optical signal is effectively sent directly from a first node to a third node, skipping an intermediate node. This scenario is implemented in an opposite direction using connector positions 5 and 6 of sets 610 and 620. Thus, an optical signal launched from connector position 6 in set 610 will pass through an intermediately connected network node from connector position 6 in set 620 to connector position 5 in set 610 to land on connector position 5 in set 620 of a third node.

Figure 7:
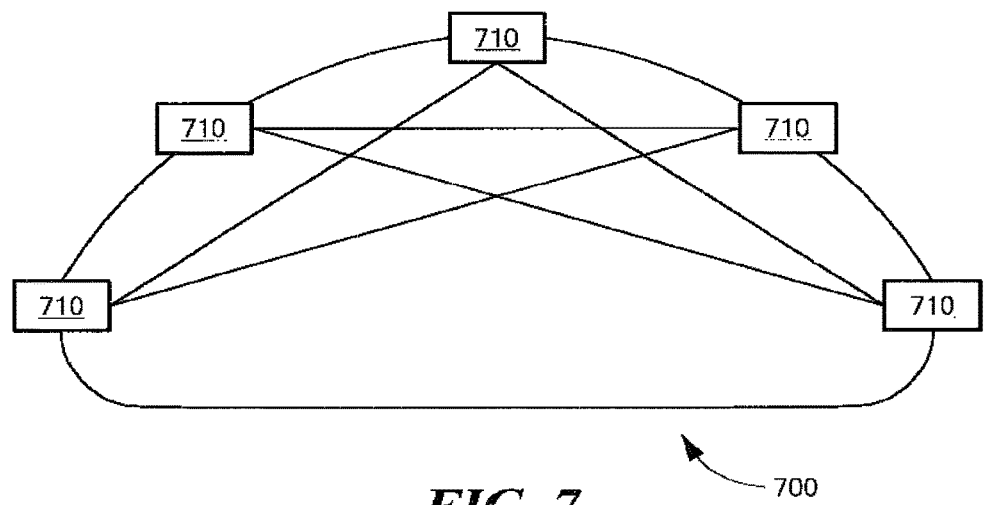
FIG. 7 is a logical network topology diagram with five nodes.

With the configuration of connector positions 1-6, a five node ring mesh network 700 can be constructed, as is illustrated in FIG. 7. Each node 710 is directly optically connected to an immediately adjacent node 710 on the ring via connector positions 1 and 2 in each set 610, 620 in each node 710. Each node 710 is also directly optically connected to a non-adjacent node 710 via connector positions 3-6 in each set 610, 620 in each node 710. The connections made using connector positions 1 and 2 are also physically direct connections, while the connections made using connector positions 3-6 are not physically direct. Accordingly, a distinction is made between a physical, direct connection and a logical or data path connection. The physical, direct connection has a direct, physical connection to another network node, such as with a connector cable. The logical or data path connection does not necessarily rely on direct, physical connection, and connected nodes need not be directly physically connected to each other. For example, a logical or data path connection may physically cross one or more nodes through several connector cables. Such a connection may be direct as between two nodes, as in the case of a chord connection in a chordal ring, and need not have a direct, physical connection, such as with a single connector cable, for implementation.

Figure 8:
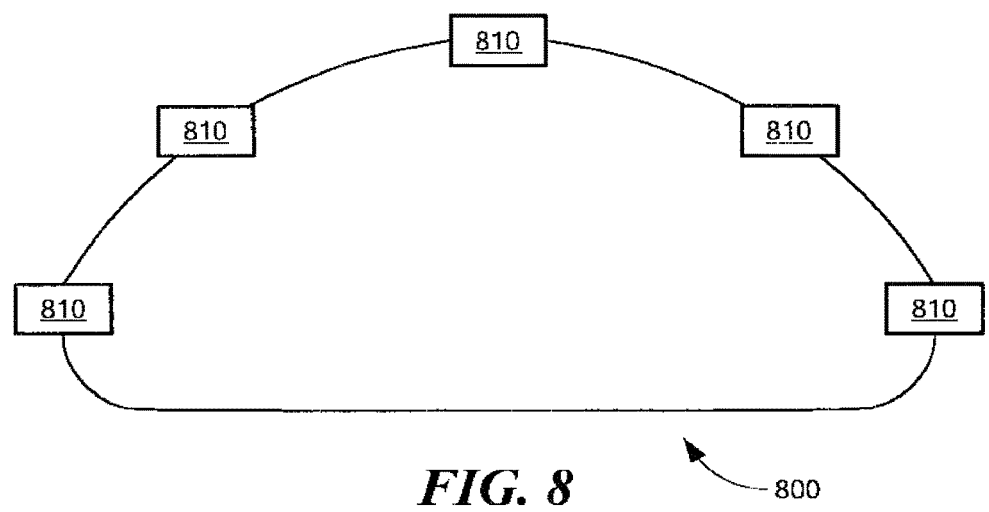
FIG. 8 is a physical network topology diagram with five nodes.

The physical cable connections for network 700 can be physically accomplished using five connector cables with six fibers each, in a physical ring topology, as illustrated in FIG. 8. Each node 810 in network 800 is configured with the connector arrangement of connector positions 1-6 in network node 600 (FIG. 6). Accordingly, each node passively passes an optical signal from connector position 4 to 3 and from connector position 6 to 5 to realize a direct optical connection to a non-adjacent, or non-physically connected node 810. Note that if the connections for the topology of network 700 were to be directly realized physically, ten cables would be used to interconnect all the nodes. With the connectivity configuration of the present disclosure, five cables in a ring connection in network 800 can be used to realize network 700 as a logical or data path connection topology.

Referring again to FIG. 6, additional multiple pass-through arrangements can be realized using standard 24 fiber cables with the configuration of connection positions 7-21. Connection positions 7-12 are shown as being single direction optical pathways, while connector positions 13-21 are shown as being bidirectional. Connection positions 7-12 are configured with offsets or position shifts to accommodate a two-node passive pass-through, in two different directions.

Thus, using the arrangement of connection positions 1-12 to implement each network node in a network permits a seven node ring mesh network to be constructed using a physical ring connection topology, or an extension of networks 700, 800 by an additional two nodes.

It is noteworthy that such an extension of networks 700, 800 to seven nodes can be achieved with relative ease, since an additional two cables would be connected to the existing network nodes 810 to form a physical ring. Presuming that each node 810 was arranged to have the configuration of network node 600, such additional connections to two additional nodes would readily produce a logical seven node mesh ring topology configuration. If such an extension were contemplated for directly physically connected nodes in a network, an additional eight cables would be used to interconnect all the nodes, and each node would have six physical cable connections. Accordingly, the connectivity configuration of the present disclosure reduces the number of physical cables used, as well as simplifies network extensions.

In the above discussion, the optical pathways are described as being unidirectional. However, it is possible to use bidirectional techniques to further improve the efficiency of the disclosed connectivity configuration. For example, bidirectional pathways are implemented with circulators 602 in network node 600 using connection positions 13-21. Circulators 602 are bidirectional fiber constructs that have an input port and an output port to permit optical signals to be sent and received on a single optical fiber. A transmit QSFP 604 and a receive QSFP 604 are coupled to each circulator 602. Each of transmit QSFP 604 and receive QSFP 604 illustrated in network node 600 are specified as QSFP-LR4. The LR4 variant in transmit and receive QSFPs 604 includes four CWDM transmitters and receivers and an optical multiplexer/demultiplexer. The LR4 variant for QSFP permits four channels to be used with one fiber pair for transmit and receive. It is possible to use nominal QSFP configurations, e.g., without an optical multiplexer/demultiplexer, which would occupy additional fibers. In addition, or alternatively, multi-core fibers can be used with such a nominal QSFP configuration to permit the number of connector positions to be less than an implementation using single core fibers.

In the arrangement shown in network node 600, connector positions 13-16 provide bidirectional pass-through with three offsets or shifts. This arrangement permits circulator 602 on connector position 13 of set 620 to communicate with circulator 602 on connector position 16 of set 610 on a node that is four nodes away, or through three intermediate nodes. The optical signal provided at connector position 13 in set 620 thus transits three pass-through nodes, being offset or shifted one connector position for each node transited, and arrives at connector position 16 at the forth node. Accordingly, a direct optical connection between connector position 13 of a first node and connector position 16 of a fourth node is established, with the direct optical connection physically passing through three intermediate nodes. In addition, because the connections are made between circulators 602, the communication between connector position 13 on a first node and connector position 16 on a fourth node is bidirectional.

Connector positions 17-21 further expand on the connectivity configuration of network node 600 by offering a direct, bidirectional optical connection between a first node and a fifth node that passes through four intermediate nodes. In total, connector positions 1-21 in sets 610, 620 permit a direct optical connection with five adjacent nodes on either side of a given node with bidirectional communication. This configuration permits ring mesh network 400 illustrated in FIG. 4 to be constructed as a physical topology that uses eleven nodes that are each physically connected to two neighboring nodes 402 in a physical ring using eleven cables. Similarly, flattened butterfly network 500 can be constructed with a physical topology that uses greatly simplified cabling, where each TOR switch can have two cables for internal node connections, and four cables for external node connections to realize a three dimensional topology.

It should be understood that a greater than five node reach can be implemented for an extended topology configuration by expanding the number of connection positions in network node 600, for example. In addition, or alternately, a greater than five node reach can be implemented by coupling a packet switch or crosspoint switch to a node. The packet switch or crosspoint switch can receive traffic from the node in the network ring and redirect traffic back into the ring, which restarts a five node reach for that node.

The present disclosure provides an advantage in simplified cabling to realize complex topologies that can be extended and be maintained with relative ease. In addition, the use of circulators and/or reduced number of cables significantly reduces fiber count, leading to significant cost savings, to the point where complex topologies become significantly more practical to realize. Moreover, the nodes are not required to multiplex/demultiplex multiple signals to permit reduced fiber count and cable connections, leading to further reductions in complexity and cost. In addition, numerous desirable topologies can be practically realized without prohibitive costs. For example, chordal ring topologies, mesh topologies, torus topologies, Manhattan grid topologies and other desired topologies, each of two, three or arbitrary dimensions, can be constructed quickly, reliably and inexpensively to permit significant advancements in complex network construction and configuration.

The foregoing description has been directed to particular embodiments of the present disclosure. It will be apparent, however, that other variations and modifications may be made to the described embodiments, with the attainment of some or all of their advantages. The scope of the appended claims is therefore not to be limited to the particular embodiments described herein, and is intended to cover all such variations and modifications as come within the true spirit and scope of the present disclosure.

What is claimed is:

1. A network switch configured to be connected in a network having a plurality of like network switches, the network switch comprising:

first and second ordered sets of external connections, wherein each external connection provides direct, optical communication between an external element outside the network switch and at least one internal element within the network switch;

a first, unidirectional communication component being one of a transmitter and a receiver, the first, unidirectional communication component being in communication with a first external connection of the first ordered set of external connections;

a second, unidirectional communication component being the other of the transmitter and the receiver, the second, unidirectional communication component being in communication with a first external connection of the second ordered set of external connections;

a first, bidirectional communication component in communication with a second external connection of the first ordered set of external connections;

a second, bidirectional communication component in communication with a second external connection of the second ordered set of external connections, wherein the second external connection of the second ordered set is offset in position from the position of the second external connection in the first ordered set by at least one position; and a direct, optical, pass-through connection pathway extending internally from a third external connection in the first ordered set to a third external connection in the second ordered set that is offset in position from the position of the third external connection in the first ordered set by at least one position, wherein the direct, optical, pass-through connection pathway provides a passive communication pathway through the network switch;

wherein, upon interconnection of the network switch into the network by connecting (a) external connections in the first ordered set of the network switch with like positioned external connections in the second ordered set of a first adjacent network switch of the plurality of like network switches via a corresponding first plurality of network links and (b) external connections in the second ordered set of the network switch with like positioned external connections in the first ordered set of a second adjacent network switch of the plurality of like network switches via a corresponding second plurality of network links, the network switch is configured to:

provide a direct, unidirectional, optical interconnection between the first, unidirectional communication component within the network switch and a corresponding second, unidirectional communication component within the first adjacent network switch or between the second, unidirectional communication component within the network switch and a corresponding first, unidirectional communication component within the second adjacent network switch;

provide a direct, optical pass-through interconnection that includes the direct, optical, pass-through connection pathway, the direct, optical pass-through interconnection terminating at one end at a transmitter and at the other end at a receiver, wherein the transmitter and receiver are disposed in network switches other than the network switch, and provide a direct, bidirectional, optical interconnection (a) between the first, bidirectional communication component within the network switch and a corresponding second, bidirectional communication component within a first non-adjacent network switch such that the direct, bidirectional, optical interconnection includes a direct, optical, pass-through connection pathway within the first adjacent network switch; or (b) between the second, bidirectional communication component within the network switch and a corresponding first, bidirectional communication component within a second non-adjacent network switch such that the direct, bidirectional, optical interconnection includes a direct, optical, pass-through connection pathway within the second adjacent network switch;

wherein a number of direct, optical, pass-through connection pathways included in the direct, bidirectional, optical interconnection defines a pass-through reach of the direct, bidirectional, optical interconnection, and wherein the pass-through reach of the direct, bidirectional, optical interconnection is equal to a largest pass-through reach in the network.

2. The network switch according to claim 1, wherein the network forms a physical topology and a logical topology.

3. The network switch according to claim 2, wherein the physical topology is one of: a ring, a q-dimensional torus ring and a q-dimensional Manhattan street topology; and the logical topology is one of: a chordal ring, a q-dimensional chordal ring and a q-dimensional chordal path topology.

4. The network switch according to claim 1, wherein the largest pass-through reach is greater than or equal to four.

5. A network switch configured to be connected in a network, the network switch comprising:

first and second ordered sets of external connections, each ordered set including positions 1 to N, wherein each external connection in the first ordered set corresponds in position to a like numbered external connection in the second ordered set, such that the network switch is interconnectable with other like network switches upon interconnection of external connections in the first ordered set with like numbered external connections of the second ordered set in an adjacent network switch, wherein each external connection provides direct, optical communication between an external element outside the network switch and at least one internal element within the network switch;

first and second communication components internally coupled to like numbered selected external connections of the first and second ordered sets of external connections respectively, so as to provide unidirectional communication between an adjacent network switch and the network switch upon interconnection of the network switch with another like network switch;

a direct optical pass-through connection pathway extending internally from a first predetermined external connection of the first ordered set to a first predetermined external connection of the second ordered set that is offset in position from the position of the first predetermined external connection in the first ordered set by at least one position, wherein the direct optical pass-through connection pathway provides a passive communication pathway through the network switch;

a first optical component internally coupled to a second predetermined external connection of the first ordered set and operative to provide bidirectional communication via the second predetermined external connection of the first ordered set; and a second optical component internally coupled to a second predetermined external connection of the second ordered set and operative to provide bidirectional communication via the second predetermined external connection of the second ordered set, wherein the first predetermined external connections of the first and second ordered sets associated with the direct optical pass-through connection pathway and, the second predetermined external connections of the first and second ordered sets of external connections associated with the first and second optical components, respectively, have positions in the first and second ordered sets such that, upon interconnection of the network switch with other like network switches, a direct optical interconnection is formed between first and second endpoints, wherein the first and second endpoints are disposed in other network switches and the direct optical interconnection includes the direct optical pass-through connection pathway, wherein a number of direct optical pass-through connection pathways through one or more network switches between endpoints of the direct optical interconnection defines a pass-through reach of the direct optical interconnection, and wherein each one of the first and second optical components of the network switch is an endpoint on another direct optical interconnection having the largest pass-through reach in the network formed upon interconnection of the network switch with other like network switches.

6. The network switch according to claim 5, further comprising at least one additional direct optical pass-through connection pathway, each additional direct optical pass-through connection pathway extending internally from a unique external connection in the first ordered set to a unique external connection in the second ordered set and providing a passive communication pathway through the network switch.

7. The network switch according to claim 5, wherein upon interconnection of the network switch with other like network switches additional direct optical interconnections are formed having other unique pairs of endpoints.

8. The network switch according to claim 5, wherein the network switch is communicatively coupled to a topology extending switch configured to receiver traffic via the network switch and to redirect traffic back into the network via the network switch.

9. The network switch according to claim 5, wherein the first communication component includes a transmitter internally coupled via a first optical fiber to the like numbered selected external connections of the first ordered set; and the second communication component includes a receiver internally coupled via a second optical fiber to the like numbered selected external connections of the second ordered set.

10. The network switch according to claim 5, wherein the largest pass-through reach is greater than or equal to four.

11. The network switch according to claim 5, further comprising:
a third optical component internally coupled to a fourth predetermined external connection of the first ordered set and operative to provide bidirectional communication via the fourth predetermined external connection of the first ordered set; and
a fourth optical component internally coupled to a fourth predetermined external connection of the second ordered set and operative to provide bidirectional communication via the fourth predetermined external connection of the second ordered set,
wherein each one of the third and fourth optical components of the network switch is an endpoint on an additional direct optical interconnection having the second largest pass-through reach in the network formed upon interconnection of the network switch with other like network switches.

12. The network switch according to claim 11, wherein the second largest pass-through reach is greater than or equal to three.

13. The network switch according to claim 5, wherein, upon interconnection of the network switch with the other like network switches, the network switch and the other network switch form a physical topology and a logical topology.

14. The network switch according to claim 13, wherein the physical topology is a ring and the logical topology is a chordal ring.

15. The network switch according to claim 13, wherein the physical topology is a q-dimensional torus ring and the logical topology is a q-dimensional chordal ring.

16. The network switch according to claim 13, wherein the physical topology is a q-dimensional Manhattan street topology and the logical topology is a q-dimensional chordal path topology.

17. The network switch according to claim 5, wherein the first optical component includes a circulator connected to an output from a transmitter and an input to a receiver, wherein the circulator is configured to permit optical signals to be sent and received on a single optical fiber connected to the second predetermined external connection of the first ordered set.

18. The network switch according to claim 17, wherein the second optical component includes a second circulator connected to an output from a second transmitter and an input to a second receiver, wherein the second circulator is configured to permit optical signals to be sent and received on a single optical fiber connected to the second predetermined external connection of the second ordered set.

19. A method for communicating over a plurality of network switches on a network in which each network switch includes first and second ordered sets of external connections, each ordered set including positions 1 to N, wherein each external connection in the first ordered set corresponds in position to a like numbered external connection in the second ordered set, wherein each external connection provides direct, optical communication between an external element outside the network switch and at least one internal element within the network switch, the method comprising:
for each network switch on the network, interconnecting each external connection in the first ordered set to a like numbered external connection in the second ordered set of a first adjacent network switch and connecting each external connection in the second ordered set to a like numbered external connection in the first ordered set of a second adjacent network switch;
in adjacent network switches of the plurality of network switches, each of the adjacent network switches having first and second communication components internally coupled to like numbered selected external connections of the first and second ordered sets of external connections respectively, providing unidirectional, optical communication from the second communication component of the first network switch to the first communication component of the second network to switch; and
providing bidirectional, optical communication between a first optical component associated with a second predetermined external connection of the first ordered set in a first network switch of the plurality of network switches and a second optical component associated with a second predetermined external connection of the second ordered set in a second network switch of the plurality of network switches, wherein the third network switch is not physically adjacent in the network to the fourth network switch, wherein providing bidirectional, optical communication between the first optical component in the first network switch and the second optical component in the second network switch includes:

traversing a direct optical interconnection between the first optical component which corresponds to a first endpoint and the second optical component which corresponds to a second endpoint, wherein the direct optical interconnection includes a direct optical pass-through connection pathway of an intermediary network switch between the first network switch and the second network switch, the direct optical pass-through connection pathway extending internally from a first predetermined external connection of the first ordered set of the intermediary network switch to a first predetermined external connection of the second ordered set of the intermediary network switch that is offset in position from a position of the first predetermined external connection of the first ordered set by at least one position, wherein the direct optical pass-through connection pathway provides a passive communication pathway through the intermediary network switch, wherein a number of direct optical pass-through connection pathways through one or more network switches between the first and second endpoints of the direct optical interconnection defines a pass-through reach of the direct optical interconnection, and wherein the pass-through reach of the direct optical interconnection between the first optical component in the first network switch and the second optical component in the second network switch is equal to the largest pass-through reach in the network.

20. The method according to claim 19, wherein the largest pass-through reach is greater than or equal to four.

21. A router configured to be connected in a network having a plurality of like routers, the router comprising:

first and second ordered sets of external connections, wherein each external connection provides direct, optical communication between an external element outside the router and at least one internal element within the router;

a first, unidirectional communication component being one of a transmitter and a receiver, the first, unidirectional communication component being in communication with a first external connection of the first ordered set of external connections;

a second, unidirectional communication component being the other of the transmitter and the receiver, the second, unidirectional communication component being in communication with a first external connection of the second ordered set of external connections;

a first, bidirectional communication component in communication with a second external connection of the first ordered set of external connections;

a second, bidirectional communication component in communication with a second external connection of the second ordered set of external connections, wherein the second external connection of the second ordered set is offset in position from the position of the second external connection in the first ordered set by at least one position; and a direct, optical, pass-through connection pathway extending internally from a third external connection in the first ordered set to a third external connection in the second ordered set that is offset in position from the position of the third external connection in the first ordered set by at least one position, wherein the direct, optical, pass-through connection pathway provides a passive communication pathway through the router;

wherein, upon interconnection of the router into the network by connecting (a) external connections in the first ordered set of the router with like positioned external connections in the second ordered set of a first adjacent router of the plurality of like routers via a corresponding first plurality of network links and (b) external connections in the second ordered set of the router with like positioned external connections in the first ordered set of a second adjacent router of the plurality of like routers via a corresponding second plurality of network links, the router is configured to:

provide a direct, unidirectional, optical interconnection between the first, unidirectional communication component within the router and a corresponding second, unidirectional communication component within the first adjacent router or between the second, unidirectional communication component within the router and a corresponding first, unidirectional communication component within the second adjacent router;

provide a direct, optical pass-through interconnection that includes the direct, optical, pass-through connection pathway, the direct, optical pass-through interconnection terminating at one end at a transmitter and at the other end at a receiver, wherein the transmitter and receiver are disposed in routers other than the router, and provide a direct, bidirectional, optical interconnection (a) between the first, bidirectional communication component within the router and a corresponding second, bidirectional communication component within a first non-adjacent router such that the direct, bidirectional, optical interconnection includes a direct, optical, pass-through connection pathway within the first adjacent router; or (b) between the second, bidirectional communication component within the router and a corresponding first, bidirectional communication component within a second non-adjacent router such that the direct, bidirectional, optical interconnection includes a direct, optical, pass-through connection pathway within the second adjacent router;

wherein a number of direct, optical, pass-through connection pathways included in the direct, bidirectional, optical interconnection defines a pass-through reach of the direct, bidirectional, optical interconnection, and wherein the pass-through reach of the direct, bidirectional, optical interconnection is equal to a largest pass-through reach in the network.

22. The router according to claim 21, wherein the largest pass-through reach is greater than or equal to four.

* * * * *